United States Patent
Yokokawa

(10) Patent No.: US 9,723,214 B2
(45) Date of Patent: Aug. 1, 2017

(54) CHARACTERISTIC IMAGE DISPLAY APPARATUS

(71) Applicant: OLYMPUS CORPORATION, Hachioji-shi, Tokyo (JP)

(72) Inventor: Ko Yokokawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/718,816

(22) Filed: May 21, 2015

(65) Prior Publication Data

US 2016/0037074 A1 Feb. 4, 2016

(30) Foreign Application Priority Data

Jul. 30, 2014 (JP) ................................. 2014-154723

(51) Int. Cl.
*H04N 5/232* (2006.01)
*H04N 5/77* (2006.01)
*H04N 1/00* (2006.01)
*H04N 9/82* (2006.01)

(52) U.S. Cl.
CPC ..... *H04N 5/23293* (2013.01); *H04N 1/00442* (2013.01); *H04N 5/23219* (2013.01); *H04N 5/772* (2013.01); *H04N 9/8205* (2013.01)

(58) Field of Classification Search
CPC .. H04N 5/23293; H04N 9/8205; H04N 9/045; H04N 1/00442; H04N 5/772
See application file for complete search history.

(56) References Cited

U.S. PATENT DOCUMENTS

2009/0225213 A1* 9/2009 Matsuyama ......... H04N 5/2256
348/333.01

FOREIGN PATENT DOCUMENTS

JP 2007-096379 A 4/2007
JP 2010-039692 A 2/2010

* cited by examiner

*Primary Examiner* — Twyler Haskins
*Assistant Examiner* — Angel L Garces-Rivera
(74) *Attorney, Agent, or Firm* — Volpe and Koenig, P.C.

(57) ABSTRACT

A characteristic image display apparatus includes a characteristics extraction unit that divides a captured image into a plurality of blocks and extracts a characteristic color from each block, a band-like image creation unit that creates a band-like image that is obtained by arranging in a line small single-color images based on characteristic colors of blocks of the captured image, and a display control unit that displays a band-like image sequence that is obtained by arranging the plurality of created band-like images.

12 Claims, 16 Drawing Sheets

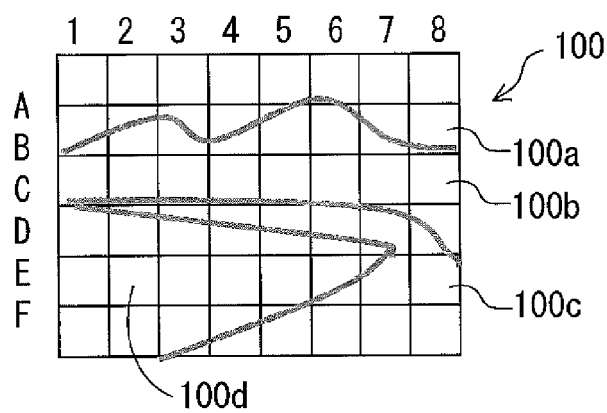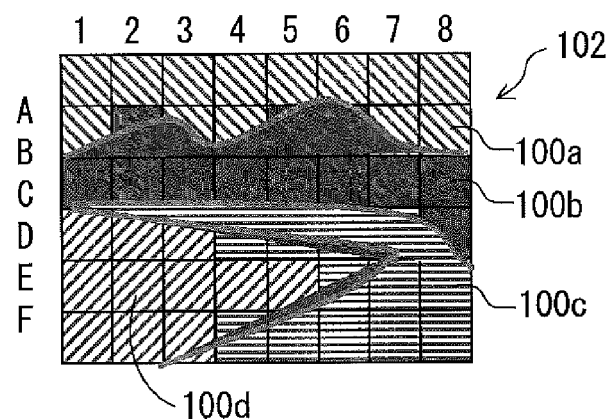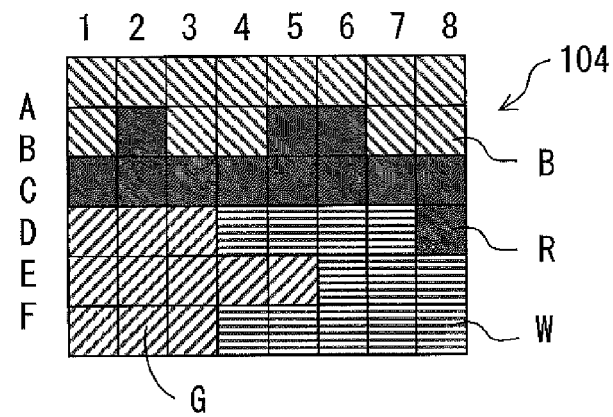
F I G. 2

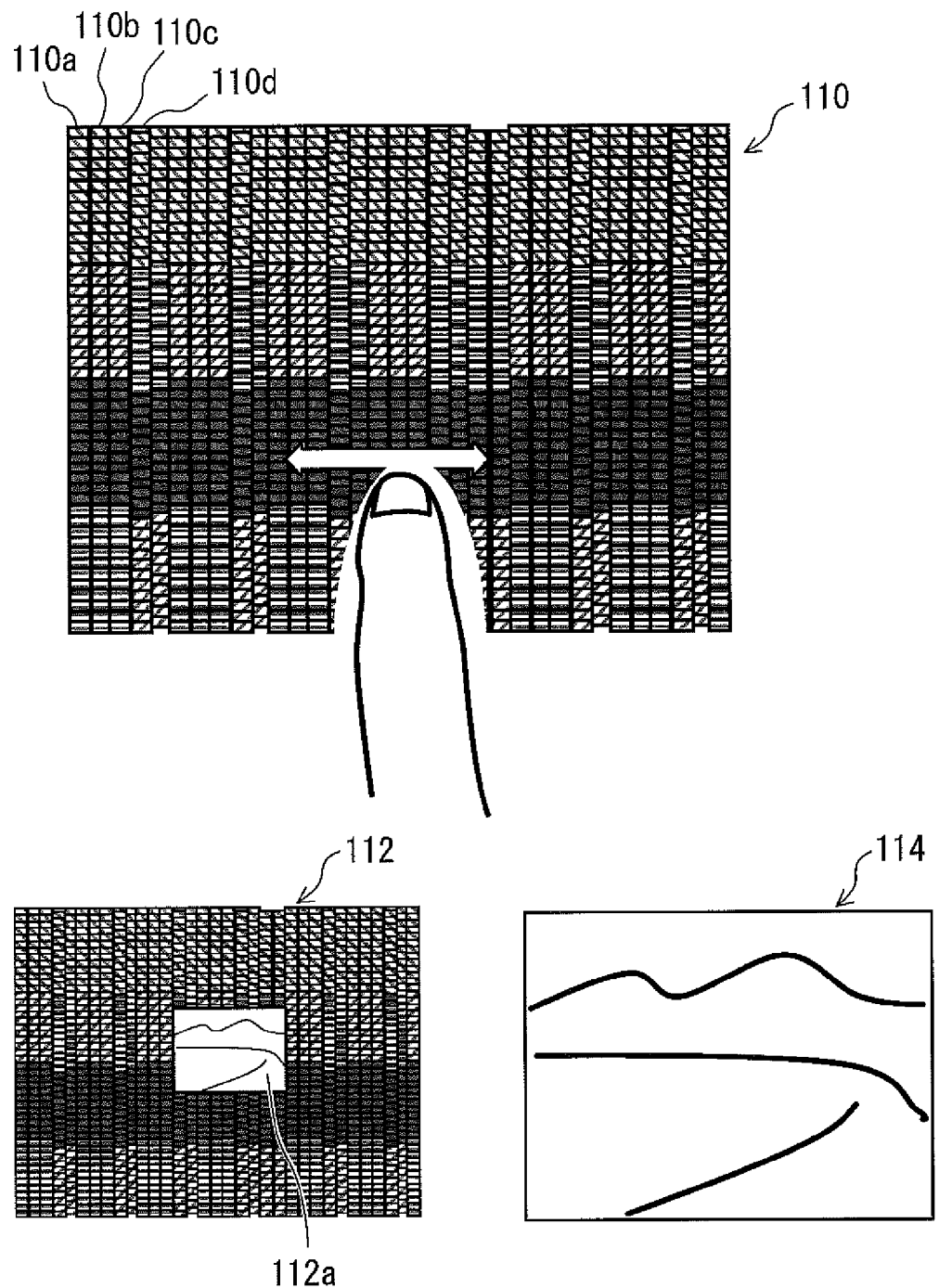
F I G. 4

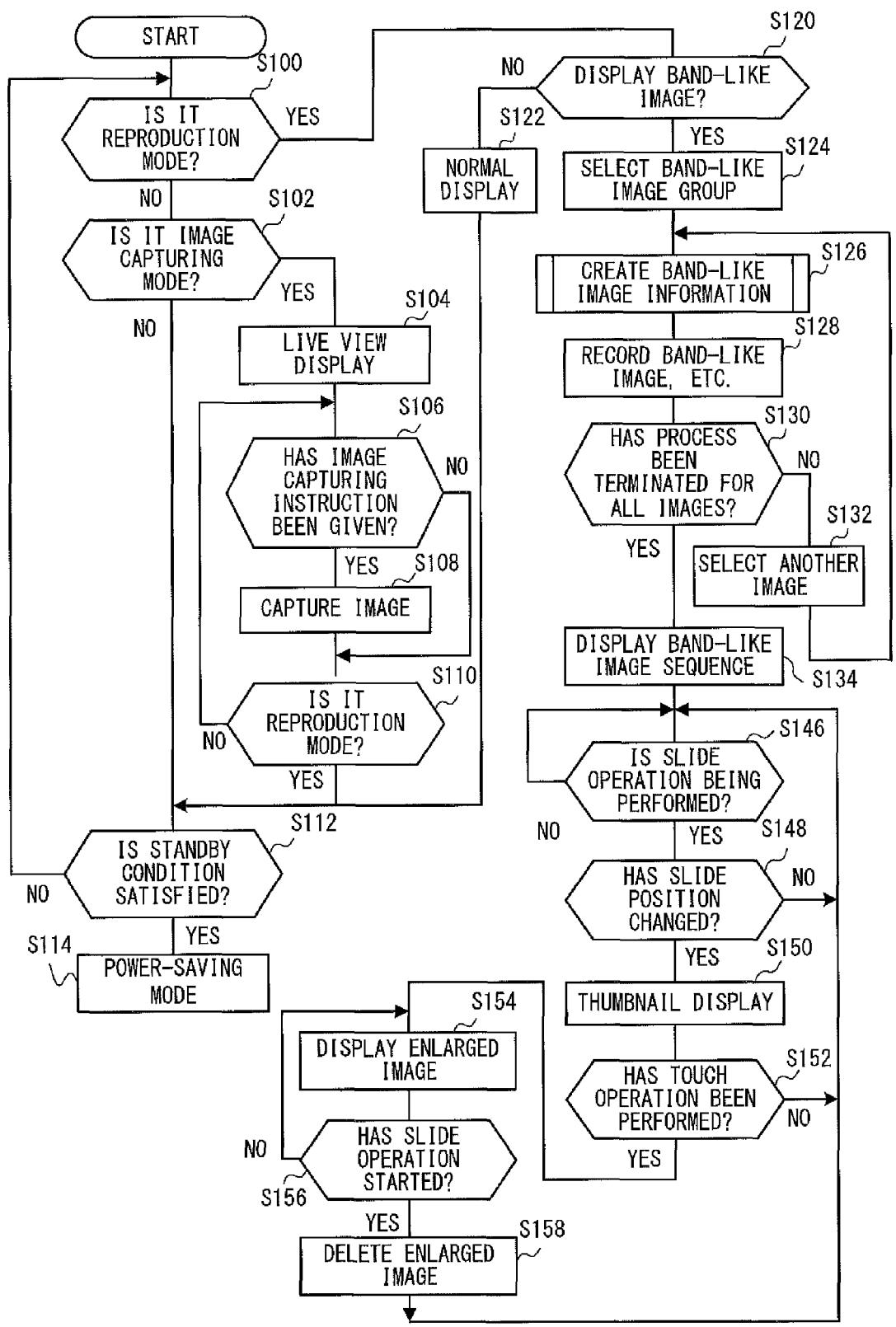
F I G. 8

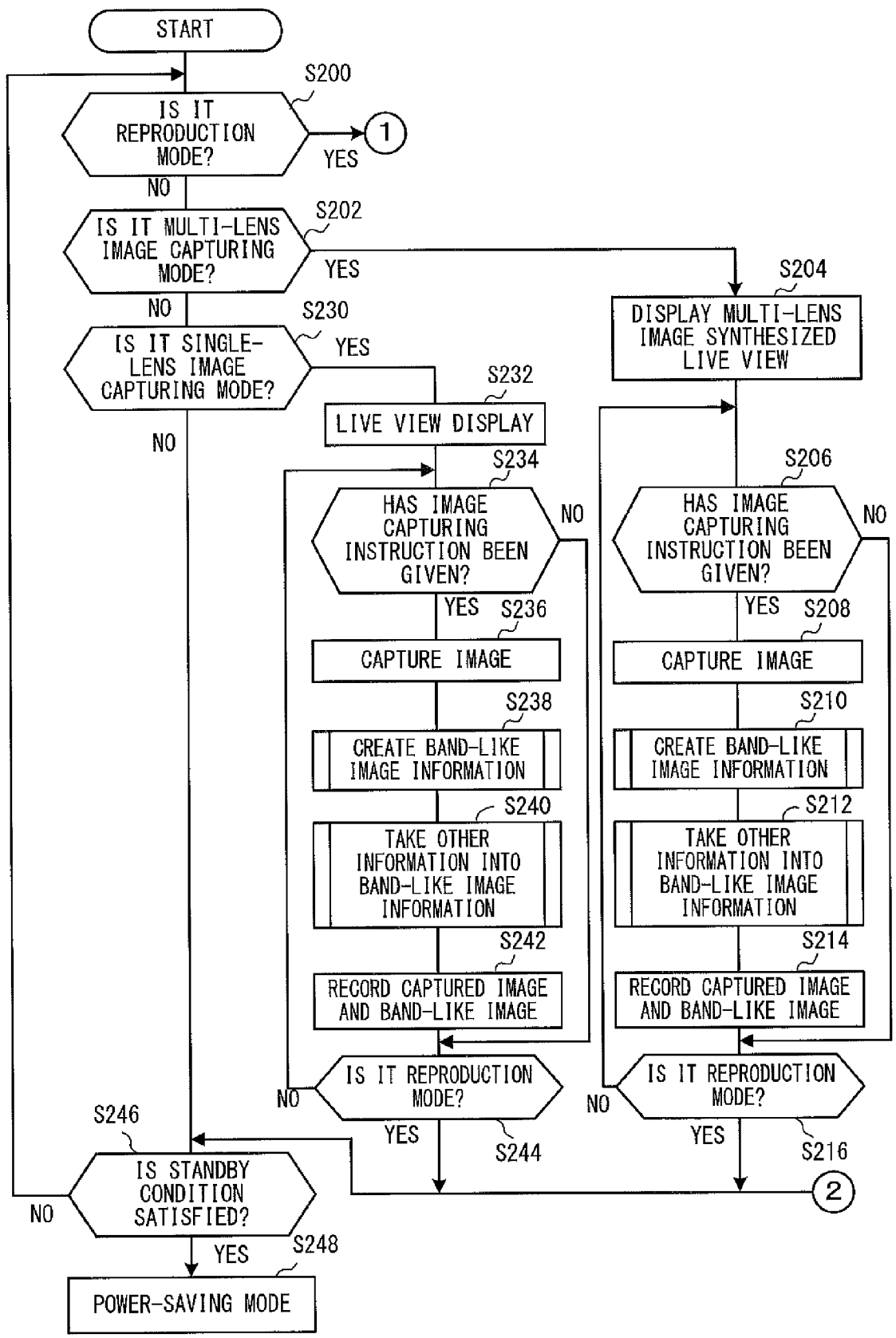
F I G. 1 2 A

CHARACTERISTIC IMAGE DISPLAY APPARATUS

CROSS-REFERENCE TO RELATED APPLICATION

This application is based upon and claims the benefit of priority of the prior Japanese Patent Application No. 2014-154723, filed on Jul. 30, 2014, the entire contents of which are incorporated herein by reference.

BACKGROUND OF THE INVENTION

Field of the Invention

The embodiments discussed herein are related to a technique for creating an image for searching by extracting characteristics of an image from the captured image.

Description of the Related Art

In an imaging device or an image device such as a digital camera, a thumbnail image is widely used as an image for searching. Thumbnail images are synthesized in a matrix, an index image is displayed on a screen, and the index image is used for searching.

In contrast, as a search method that does not use thumbnail images, an image classification apparatus that classifies images according to color so as to facilitate searching is proposed (Japanese Laid-open Patent Publication No. 2010-39692).

SUMMARY OF THE INVENTION

Even though a search using thumbnail images is effective, estimation of an image content becomes difficult when the display size of the thumbnail image becomes small. That is, in a search using thumbnail images, it is necessary to display the thumbnail image at a size larger than or equal to a certain size. On a small display unit such as that mounted on a digital camera, the maximum number of thumbnail images that can be displayed on one screen at a time is 20 to 30. On the other hand, since the number of captured images that may be recorded in a camera often exceeds 1000, a search using thumbnail images takes much time. In lieu of a thumbnail image, a proposal for a new search image that is composed of information representing characteristics of a captured image is required. In view of the above problem, the invention as claimed in the application concerned aims to provide a characteristic image display apparatus that extracts characteristics from a captured image and displays the extracted characteristics as an image.

In order to attain the above aim, the characteristic image display apparatus includes a characteristics extraction unit configured to divide a captured image into a plurality of blocks and extract a characteristic color from each block, a band-like image creation unit configured to create a band-like image obtained by arranging in a line small single-color images based on characteristic colors of blocks of the captured image, and a display control unit configured to display a band-like image sequence obtained by arranging the plurality of created band-like images.

According to the present invention, it is possible to provide a characteristic image display apparatus that extracts characteristics from an image and displays the extracted characteristics as an image.

BRIEF DESCRIPTION OF DRAWINGS

FIG. 2 is a diagram explaining a process for deciding characteristic colors using a characteristics extraction unit.

FIG. 4 is a diagram illustrating display examples of a band-like image sequence.

FIG. 8 illustrates a main flowchart explaining a process for creating and displaying a band-like image in reproduction.

FIG. 12A illustrates main flowchart 1 explaining procedures for a process for creating a band-like image.

DETAILED DESCRIPTION OF THE PREFERRED EMBODIMENTS

Figure 1:
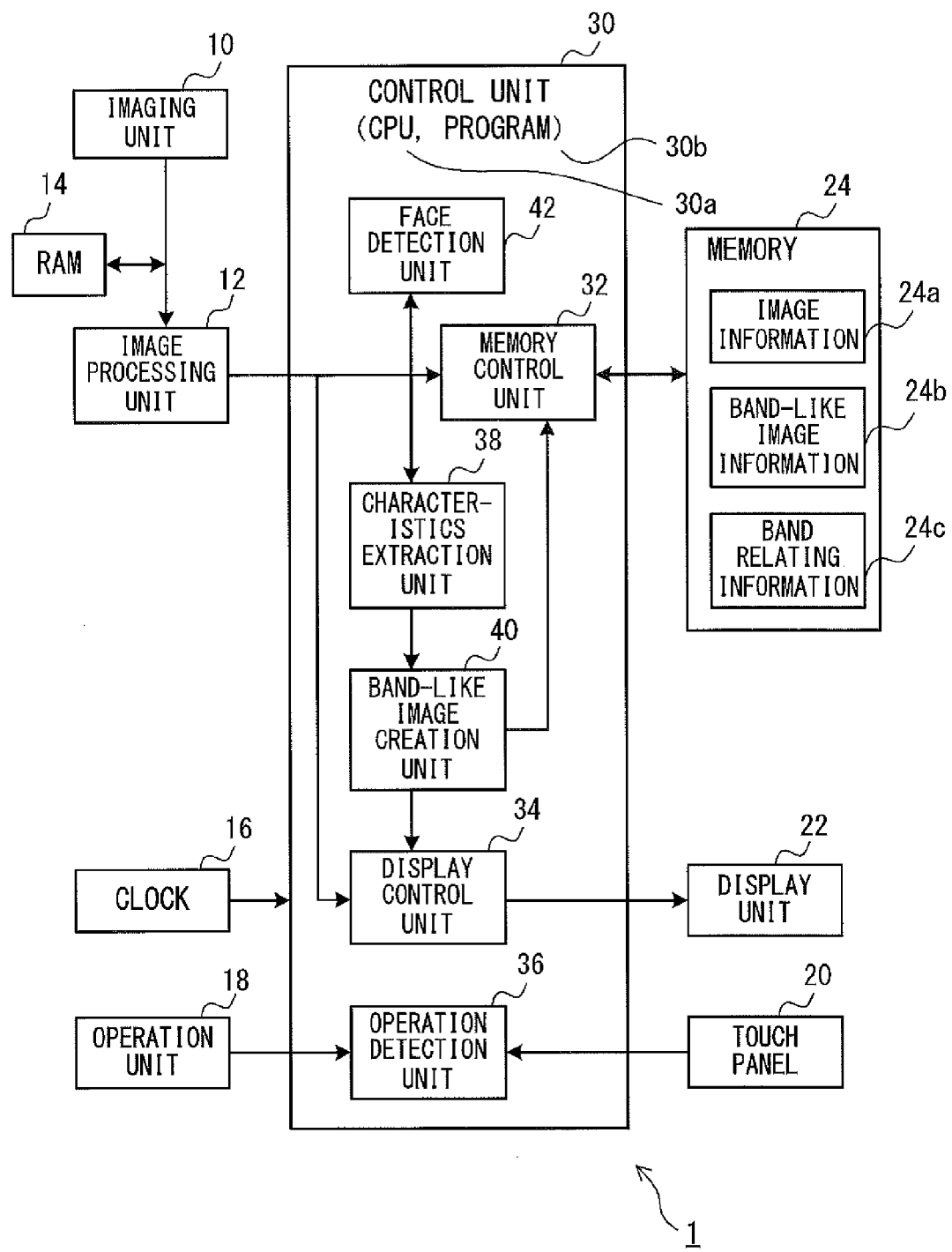
FIG. 1 is a block diagram of a digital camera mounted with a characteristic image display apparatus according to embodiment 1.

Hereinafter, embodiments of the present invention will be described with reference to the drawings. FIG. 1 is a block diagram of a digital camera 1 mounted with a characteristic image display apparatus of the present invention according to embodiment 1. The digital camera 1 includes an imaging unit 10, an image processing unit 12, a RAM 14, a clock 16, an operation unit 18, a touch panel 20, a display unit 22, a memory 24, and a control unit 30.

The imaging unit 10 includes: a camera unit that includes a lens for forming an object image and an image sensor for photoelectrically converting a formed image signal and outputting the signal as an image signal; and an imaging circuit unit that adjusts a gain of the image signal, performs AD conversion, and outputs the signal as image data.

The image processing unit 12 executes various image processes on image data, and examples of the various image processes include gain adjustment, a color interpolation process, a WB (white balance) process, a γ(gamma) process, and a compression and expansion process (for example, a JPEG process).

The RAM 14 is a temporary storage memory that stores image data that is output from the imaging unit 10 and functions as a working area in various processes of the image processing unit 12. The clock 16 outputs date and time information that is recorded together with a captured image.

The operation unit 18 is configured to convey various operation instructions from a photographer to the digital camera 1. The operation unit 18 includes a power button for instructing on-off control of a power source, a mode button for switching between an image capturing mode and a reproduction mode, a release button for instructing execution of image capturing, an X-Y direction button, etc.

The touch panel 20 is operation means for detecting a user contact position on a screen, and is provided integrally with the display unit 22. The display unit 22 includes for example an LCD and is arranged for example at the back of the digital camera 1. In the image capturing mode, a live view that is output from the imaging unit 10 is displayed on the display unit 22. In the reproduction mode, a recorded captured image is displayed on the display unit 22.

The memory 24 is a storage memory for retaining captured image information and the like. The memory 24 stores together with normal image information 24a that is compression-processed by the image processing unit 12, band-like image information 24b that is created according to a captured image, and band relating information 24c that shows the relationship between the image information 24a and the band-like image information 24b. The band relating information 24c is information for associating the image information 24a and the band-like image information 24b of a captured image and showing the relationship between a band-like image and the captured image, which is the original image of the band-like image.

The control unit 30 is a control unit that generally controls the entirety of the digital camera 1. The control unit 30 includes a CPU 30a and a control program 30b. The CPU 30a loads the control program 30b and executes a control process.

The control unit 30 includes as a function unit related to a display control process that is executed by the CPU 30a a memory control unit 32, a display control unit 34, an operation detection unit 36, a characteristics extraction unit 38, a band-like image creation unit 40, a face detection unit 42, etc.

The memory control unit 32 writes in the memory 24 image information 24a, band-like image information 24b, and band relating information 24c in the image capturing mode or the reproduction mode. In addition, the memory control unit 32 reads from the memory 24 image information 24a, band-like image information 24b, and band relating information 24c in the reproduction mode.

The display control unit 34 controls the display unit 22 and displays a specified image on the display unit 22. In the reproduction mode, the display control unit 34 displays on the display unit 22 according to an instruction a captured image or a band-like image sequence that is obtained by arraying band-like images.

The operation detection unit 36 judges an operation instruction content from an operator according to a signal from the operation unit 18. In addition, the operation detection unit 36 receives a signal that is output from the touch panel 20, detects a touch position, a touch time, a touch direction, etc. and determines the touch operation content. The control unit 30 switches a camera operation according to the operation content that has been detected by the operation detection unit 36.

The characteristics extraction unit 38 divides the screen into a matrix (for example 8×6), divides a captured image into a plurality of blocks, extracts a characteristic color for each block, and decides the characteristic color. For example, the characteristics extraction unit 38 divides one block into smaller areas, extracts a color component in each area, and extracts as the characteristic color in the group the most common color in the areas.

When the characteristics extraction unit 38 extracts a color component in each area, the characteristics extraction unit 38 may detect as a color component a color approximate to one of the roughly 20 color divisions without taking subtle hue differences into consideration. Although "black and white" are originally not hues, since humans recognize "black and white" as color tones similarly to "red and blue", the characteristics extraction unit 38 treats "black and white" as colors hereinafter.

The band-like image creation unit 40 creates band-like image information related to a band-like image that is obtained by arranging in a line small images based on characteristic colors of blocks of a captured image. Specifically, the band-like image creation unit 40 classifies the characteristic colors into color groups. The color groups are classifications that are obtained by dividing all the hues into roughly 3-8 divisions. Specifically, the color groups are classifications such as "blue, green, and red", "blue, green, red, magenta, cyan, and yellow", or "blue, green, red, white, and black".

For example, in the case in which the color groups are set to "blue, green, red", when the characteristic colors of blocks are reddish colors such as "red mixed with green, red including blue, or pale red", the characteristic colors are classified into a red group. The band-like image creation unit 40 classifies the characteristic colors into the color groups and calculates the number of blocks that have been classified into each color group.

The band-like image creation unit 40 creates a band-like image by connecting in a longitudinal line as many rectangular cell images (small images), each regarded as a block, as the number of blocks. The cell images are arranged in units of a color group. For example, cell images that belong to a blue group are put on the top, cell images that belong to a green group are put on the second place from the top, and cell images that belong to the red group are put on the third place from the top. The order of color groups may be in descending order of classified characteristic colors or may be in a predetermined order. For example, when blue is set to be placed on the top, an image with a large blue sky is easier to be found. Note that the total number of cell images is not necessarily the same as the number of blocks, and some blocks may be thinned out or added.

The band-like image creation unit 40 may set cell images that are arranged in order of color group in a characteristic color or in a color obtained by increasing the chroma of the characteristic color. By displaying a cell image in a color that is obtained by increasing the chroma of a characteristic color, identifiability further improves as compared with the case of displaying the characteristic color as it is.

Alternatively, the band-like image creation unit 40 displays a cell image by converting a characteristic color into the pure color of the color group to which the characteristic color belongs. That is, when a characteristic color is red mixed with green, pure red is displayed. This is because a pure color has a higher identifiability.

In addition, in the case in which "black and white" are included in the color groups, when a characteristic color is pale gray, the band-like image creation unit 40 may classify it as white, and when a characteristic color is dark gray, the band-like image creation unit 40 may classify it as black. In addition, the face detection unit 42 detects the presence or absence of a face on a screen according to captured image data.

A band-like image that is created by the control unit 30 will be specifically explained with reference to FIGS. 2-5. FIG. 2 is a diagram explaining a process for deciding characteristic colors by the characteristics extraction unit 38. All the screens illustrated in FIG. 2 are those of the display unit 22. The top screen 100 in FIG. 2 shows a captured image and illustrates the contour of an object. A blue sky 100a extends over the entire width of the screen at the upper part of the screen, mountains 100b range below the blue sky 100a, a river 100c running through the bottom of the mountains 100b meanders in the middle and changes its flow toward the front, and lush grassland 100d spreads at the left side of the river 100c.

For example, the characteristics extraction unit 38 divides the screen of the display unit 22 vertically into six and horizontally into eight, and thus the screen is divided into 48 blocks (see the screen 100). A screen 102 is a diagram illustrating a color distribution of the captured image. Here, for convenience of explanation, colors are represented in a simplified manner. Although a fine gradation and a change in hue exist in the blue sky 100a, it is assumed that the blue sky 100a is generally blue. In addition, it is assumed that the mountain 100b is generally brown, the river 100c is generally bluish white, and the grassland 100d is generally pale green. Furthermore, it is assumed that the color groups are set to "blue, green, red, white, and black". Note that as displayed on the screen 100, coordinates in the Y direction on the screen are set to A-F, coordinates in the X direction on the screen are set to 1-8, and each block is denoted by YX coordinates.

A screen 104 shows a characteristic color of each block, which has been decided by the characteristic extraction unit 38. Blocks whose characteristic colors belong to the same color group are shown in the same hatching. It is assumed that the characteristic color of block A1 is extracted as "dark blue" and the characteristic color of block A8 is extracted as "pale blue". The band-like image creation unit 40 classifies as the blue group (B) 13 blocks in total, such as block A1 and block A8.

It is assumed that the characteristic colors of blocks C1 and C2 are extracted as brownish colors. The band-like image creation unit 40 classifies into the red group (R) 12 blocks in total, such as block C1 and block C8.

It is assumed that the characteristic colors of blocks D5 and F8 are extracted as whitish colors. The band-like image creation unit 40 classifies into the white group (W) 12 blocks in total, such as block D5 and block F8. It is assumed that the characteristic colors of blocks D1 and F1 are extracted as greenish colors. The band-like image creation unit 40 classifies into the green group (G) 11 blocks, such as block D1 and block F1. In this example, it is assumed that there are no blocks that fall into the black group (K).

Figure 3:
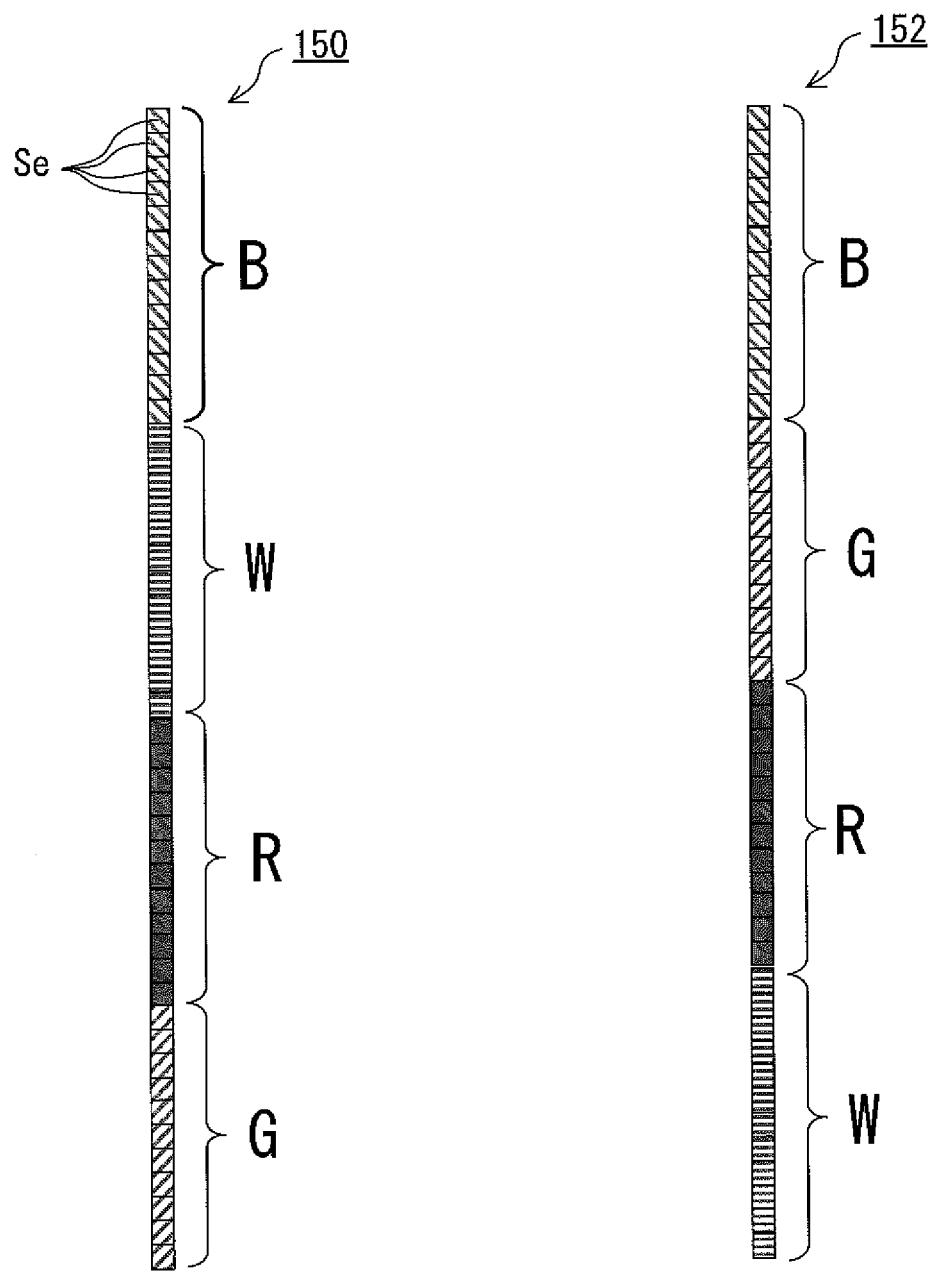
FIG. 3 is a diagram illustrating examples of a band-like image.

FIG. 3 is a diagram illustrating examples of a band-like image. The band-like images are based on the screen in FIG. 2. The band-like image creation unit 40 creates a band-like image obtained by longitudinally connecting as many rectangular single-color cell images Se that correspond to a characteristic color as the number of blocks (48 in this example). The band-like image creation unit 40 connects the cell images Se in units of a color group.

The band-like image 150 on the left in FIG. 3 is obtained by sorting the order of color groups in descending order of the number of classified blocks. The blue group (B), the white group (W), the red group (R), and the green group (G) are arranged in this order from the top. The band-like image creation unit sets each cell image Se as a single color based on a characteristic color. Here, the cell image Se is displayed as a pure color obtained by increasing the chroma of the characteristic color. Therefore, all the cell images Se of the same group have the same hue. The cell image Se may be small in size, and may be a small image of about 3×3 dots on a screen in case of a small display unit.

The band-like image 152 on the right in FIG. 3 is created in a predetermined color group order. For example, it is assumed that the predetermined order from the top is the blue group (B), the green group (G), the red group (R), the white group (W), and the black group (G). Since there are no blocks whose characteristic color is black in the screen example in FIG. 2, the band-like image is created in the order of blue, green, red, and white from the top.

FIG. 4 is a diagram illustrating display examples of a created band-like image sequence. A screen 110 is an example in which a set of band-like images that are arrayed horizontally (band-like image sequence) in the reproduction mode is displayed. One band-like image is created for each captured image by the band-like image creation unit 40.

The display control unit 34 composes the band-like image sequence by horizontally arraying band-like images 110a, 110b, 110c, 110d . . . that are created according to captured images in order of image capturing date and time, and displays the band-like image sequence on the display unit 22. The band-like image at the left end of the screen 110 is that of the image of the oldest image capturing date and time and the band-like image of an image of more recent image capturing date and time appears as it proceeds to the right.

When a slide operation in the horizontal direction is performed on the band-like image sequence on the screen 110, the captured image of the band-like image that corresponds to the position of the moved finger is displayed at the position of the band-like image as a thumbnail image 112a, as illustrated on a screen 112. Due to the slide operation in the horizontal direction on the band-like image sequence, the thumbnail image 112a is switched to be displayed. In addition, when a single touch operation is performed on the currently displayed thumbnail image 112a, an image obtained by enlarging the thumbnail image 112a is displayed as illustrated on a screen 114.

Figure 5:
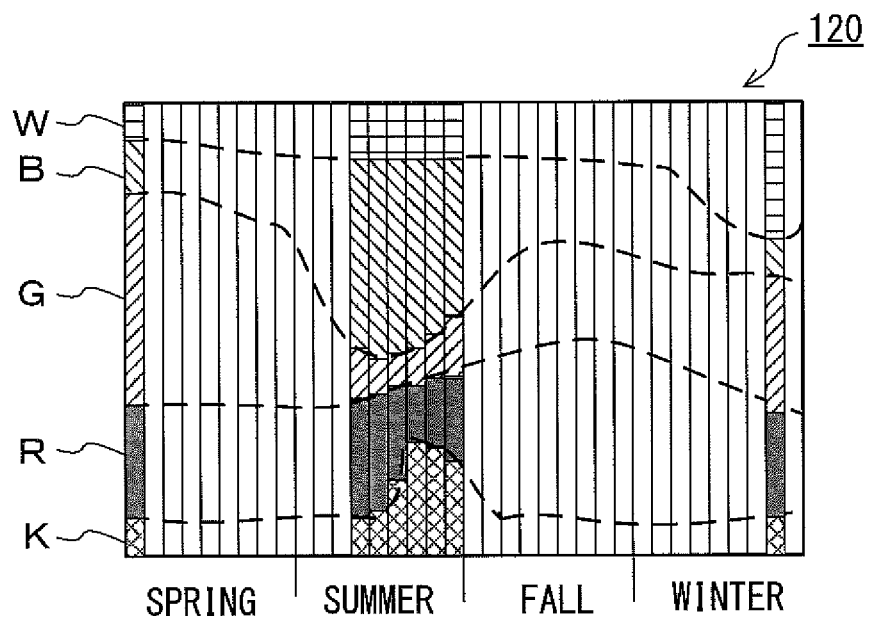
FIG. 5 is a diagram illustrating an example of an image search that is performed by using a band-like image sequence.

FIG. 5 is a diagram illustrating an example of an image search that is performed by using the band-like image sequence. Here, it is assumed that the display order of color groups is the predetermined order, white (W), blue (B), green (G), red (R), and black (K) from the top. In addition, it is assumed that on a screen 120, the band-like image sequence that corresponds to captured images for one year from spring to winter is displayed on one screen.

Since objects change according to season, the color balance of a captured image changes according to season. For example, since opportunities for capturing an image outdoors increase in summer, there is a possibility that bluish colors will increase in captured images. In addition, even in the case of outdoor image capturing, there is a possibility that bluish colors in the daytime and blackish colors in the nighttime will increase in summer and reddish colors will increase in fall. Changes in color balance are quite accurately reflected in the band-like image sequence. A color change tendency according to season is illustrated as a curve with a broken line. A photographer may roughly grasp the captured time of the captured image according to the color balance and change in the band-like image sequence or the size of a specific color, and may search for a desired image.

Figure 6:
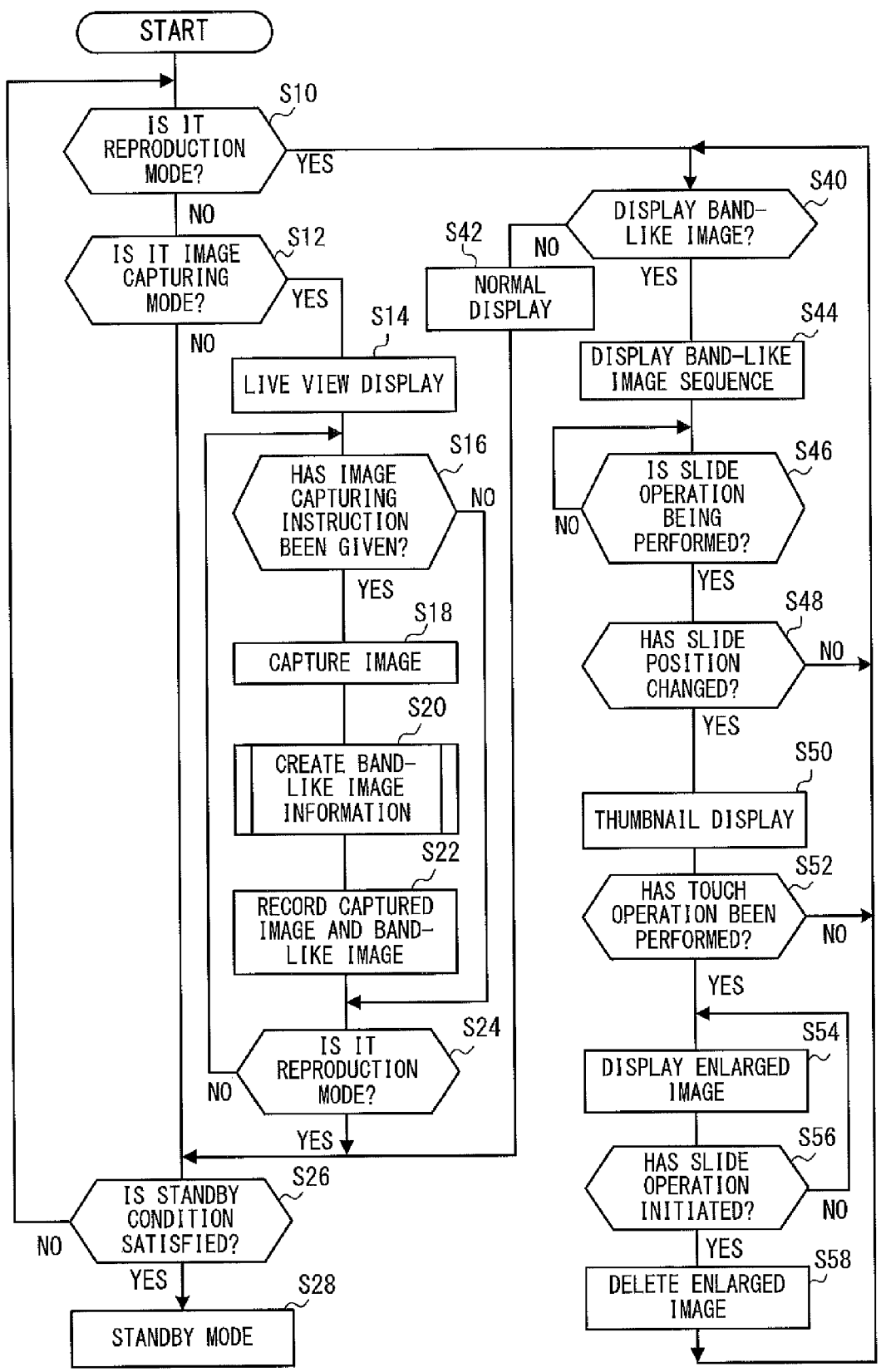
FIG. 6 illustrates a main flowchart explaining procedures for a process for creating and displaying a band-like image.
Figure 7:
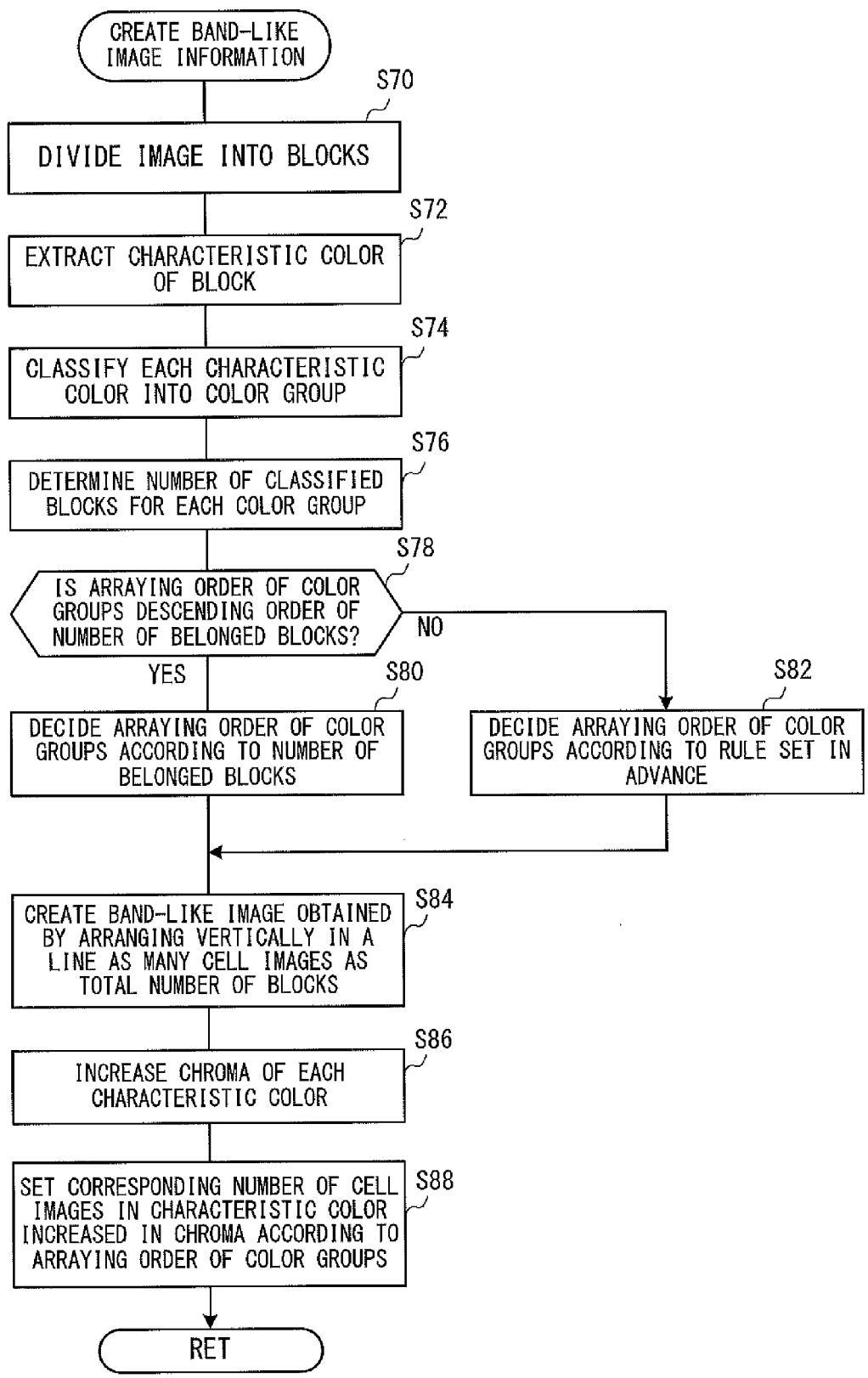
FIG. 7 illustrates a subroutine explaining a process for creating a band-like image.

Next, a process for creating and displaying a band-like image will be described with reference to FIGS. 6-8. FIG. 6 is a main flowchart explaining procedures for the process for creating and displaying a band-like image. FIG. 6 illustrates a process in the case of creating a band-like image when an image is captured. A process for creating a band-like image in reproduction will be described later in FIG. 8.

The process for creating and displaying a band-like image is executed by the control unit 30 (including the memory control unit 32, the display control unit 34, the operation detection unit 36, the characteristics extraction unit 38, and the band-like image creation unit 40).

The control unit 30 judges whether or not the mode is the reproduction mode (step S10). The operation detection unit 36 detects an operation of a mode button, which is included in the operation unit 18, and judges whether the mode is the reproduction mode or an image capturing mode. When the control unit 30 judges that the mode is not the reproduction mode (No in step S10), then the control unit 30 judges whether or not the mode is the image capturing mode (step S12).

When the control unit 30 judges that the mode is not the image capturing mode either (No in step S12), the process proceeds to step S26. When the control unit 30 judges that the mode is the image capturing mode (Yes in step S12), the control unit 30 initiates an image capturing process, and the display control unit 34 displays a live view on the display unit 22 (step S14).

The operation detection unit 36 judges whether or not an instruction to capture an image has been given according to an operation of the release button, which is included in the operation unit 18 (step S16). When the control unit 30 judges by means of the operation detection unit 36 that the instruction to capture an image has been given (Yes in step S16), the control unit 30 executes image capturing (step S18). When the control unit 30 judges that an instruction to capture an image has not been given (No in step S16), the process proceeds to step S24.

The control unit 30 executes a band-like image information creation process after capturing an image (step S20). FIG. 7 is a subroutine explaining procedures for the band-like image information creation process.

The characteristics extraction unit 38 divides an image into blocks (step S70). As described in the abovementioned screen 100 in FIG. 2, the image is divided into, for example, 48 blocks. The characteristics extraction unit 38 extracts a characteristic color of a block (step S72). For example, the characteristics extraction unit 38 divides the block into further smaller areas, extracts a color in each area, and extracts as the characteristic color of the block the most common color.

The band-like image creation unit 40 classifies the extracted characteristic colors into color groups (step S74). For example, the color groups are the "blue, green, red, white, and black" groups. The band-like image creation unit 40 determines the number of classified blocks for each color group (step S76).

The band-like image creation unit 40 judges whether or not the color group arraying order is to be decided in descending order of the number of blocks that belong to each group (step S78). Whether the color group arraying order is set to "descending order of the number of blocks" or "the order based on a predetermined rule" may be selected as a choice by a user or may be set to one of them.

When the band-like image creation unit 40 judges that "deciding the color group arraying order according to the number of blocks that belong to each group" has been selected (Yes in step S78), the band-like image creation unit 40 decides the color group arraying order according to the number of blocks that belong to each group (step S80), which is the example that is displayed on the screen 150 on the left in FIG. 3. Here, in the same manner as in the screen 150 in FIG. 3, the band-like image creation unit 40 may array the color groups from the top in descending order of the number of blocks, but may array the color groups in reverse order.

When the band-like image creation unit 40 judges that "deciding the color group arraying order according to the number of blocks that belong to each group" has not been selected (No in step S78), the band-like image creation unit 40 decides the arraying order of color groups according to a predetermined rule (step S82), which is the example displayed on the screen 152 on the right in FIG. 3, and the order of color groups is fixed due to this method.

The band-like image creation unit 40 creates a band-like image obtained by vertically arranging in a line as many cell images as the total number of blocks (step S84). Note that the number of cell images may not necessarily coincide with the total number of blocks, and may be smaller or greater than the total number of blocks.

In addition, band-like image creation unit 40 increases the chroma of each characteristic color (step S86). Not only may the band-like image creation unit 40 increase the chroma of the characteristic color, it may also change the characteristic color into the pure color of the color of the group to which the characteristic color belongs. When all the colors of the cell images turn into pure colors, identifiability of the band-like image further improves. In addition, the band-like image creation unit 40 may change the characteristic colors other than the characteristic color that has the highest chroma among the characteristic colors into the characteristic color that has the highest chroma, and may make the color of the cell images in a group the same. Note that the characteristic color of each block that has been extracted in step S72 may be used as the color of each cell image as it is. In this case, the colors of the cell images in a group might change slightly from one another.

The band-like image creation unit 40 sets, according to the color group arraying order, the colors of as many cell images as correspond to each color group to one of "characteristic colors obtained by increasing their chroma", "characteristic colors that are pure colors", and "characteristic colors as they are" (step S88). Note that blocks that have been judged to have halation or black defects may be deleted. In addition, in regard to color groups, color groups with a small number of blocks that are classified thereto may be deleted, and a single-color band-like image may be obtained by setting one color group.

Returning to FIG. 6, the control unit 30 records the captured image and the band-like image (step S22). The memory control unit 32 records on the memory 24 the image information 24a, the band-like image information 24b, and the band relating information 24c of the captured image. The band relating information 24c is information for associating the image information 24a and the band-like image information 24b of the captured image with each other and is information for showing the relationship between the band-like image and the captured image that is the original image of the band-like image.

The control unit 30 judges whether or not the mode is the reproduction mode (step S24). When the control unit 30 judges that the mode is not the reproduction mode (No in S24), the process returns to step S16. When the control unit 30 determines that the mode has changed from the image capturing mode to the reproduction mode due to switching by means of the mode button (Yes in step S24), then the control unit 30 judges whether or not the a standby condition is satisfied (step S26). The standby condition is a condition for transferring to a power-saving mode, which is a standby mode, and is satisfied, for example, when no operations have been performed for a fixed period of time.

When the control unit 30 judges that the standby condition is not satisfied (No in step S26), the process returns to step S10. When the control unit 30 judges that the standby condition is satisfied (Yes in step S26), the control unit 30 executes the power-saving mode (step S28). Note that the control unit 30 releases the power-saving mode when any operation is detected by means of the operation detection unit 36.

Returning to step S10, when the control unit 30 judges that the mode is the reproduction mode (Yes in step S10), the control unit 30 decides whether or not to display the band-like image (step S40). The control unit 30 judges by means of the operation detection unit 36 whether or not an instruction to display the band-like image has been given from the photographer. When the control unit 30 judges that there are no instructions to display the band-like image (No in step S40), normal display is performed (step S42), and the process proceeds to the aforementioned step S26. Examples of the normal display include single-screen display and thumbnail image display.

When the control unit 30 judges that there has been an instruction to display the band-like image (Yes in step S40), the control unit 30 displays the band-like image sequence that is obtained by arranging band-like images (step S44). Specifically, the memory control unit 32 reads from the memory 24 the necessary band-like image information 24b with reference to the band relating information 24c, and stores the band-like image information 24b in the RAM 14. The display control unit 34 synthesizes the plurality of pieces of read band-like image information 24b, creates the band-like image sequence that is obtained by horizontally arranging the band-like images in one line, and displays the band-like image sequence on the display unit 22, which is the screen 110 illustrated in FIG. 4. For example, approximately 100 to 1000 band-like images are displayed on the display unit 22 collectively as the band-like image sequence.

The control unit 30 judges by means of the operation detection unit 36 whether or not a slide operation is being performed on the displayed band-like image sequence (step S46). The operation detection unit 36 detects a slide operation on the touch panel 20. When the control unit 30 judges that a slide operation is not being performed (No in step S46), the control unit 30 waits for a slide operation. When the control unit 30 judges that a slide operation is being performed on the band-like image sequence (Yes in step S46), the control unit 30 judges whether or not the slide position has changed (step S48). When the control unit 30 judges that a finger in contact has moved to the right or left and the slide position has changed (Yes in step S48), the display control unit 34 displays on the band-like image sequence as a thumbnail image the captured image that corresponds to the band-like image on a position to which the finger has moved (step S50), which is the example displayed on the screen 112 in FIG. 4.

Specifically, from the finger position on the touch panel 20 that has been detected by means of the operation control unit 36, the control unit 30 detects the band-like image that is being pointed out by the finger and specifies the corresponding image information 24a by using the band relating information 24c. Then, the memory control unit 32 reads the corresponding image information 24a from the memory 24, and the display control unit updates the thumbnail image according to the image information 24a and displays the updated thumbnail image.

Therefore, the photographer may select a thumbnail image by performing a slide operation on the band-like image sequence. In addition, after the control unit 30 displays a new thumbnail image without deleting the band-like image sequence, the process proceeds to step S52.

When the control unit 30 judges by means of the operation detection unit 36 that the slide position has not changed (No in step S48), that is, judges that the finger position has not moved, the process returns to step S40.

In addition, the control unit 30 judges that a touch operation has been performed after the finger separates from the touch panel 20 (step S52). When the control unit 30 judges that a touch operation has not been performed (No in S52), the process returns to step S40 in a state in which the band-like image sequence is displayed.

When the control unit 30 judges that a touch operation has been performed (Yes in step S52), the display control unit 34 displays an enlarged image of the thumbnail image that is displayed while being superimposed on the band-like image sequence (step S54), which is the example displayed on the screen 114 in FIG. 4.

The control unit 30 judges whether or not a slide operation has been initiated on the enlarged image (step S56). When the control unit 30 judges that a slide operation has not been initiated (No in step S56), the process returns to step S54. When the control unit 30 judges that a slide operation has been initiated (Yes in step S56), the control unit 30 deletes the enlarged image (step S58) and the process returns to step S40.

FIG. 8 is a main flowchart explaining procedures in the case of creating a band-like image in reproduction. Since the flowchart in FIG. 8 is different from that in FIG. 6 in the timing of the band-like image information creation process but is the same in the other processes, the common processes will be briefly described.

The process for creating and displaying a band-like image is executed by the control unit 30 (including the memory control unit 32, the display control unit 34, the operation detection unit 36, the characteristic extraction unit 38, and the band-like image creation unit 40).

The control unit 30 judges whether or not the mode is the reproduction mode (step S100). When the control unit 30 judges that the mode is not the reproduction mode (No in step S100), the control unit 30 judges whether or not the mode is the image capturing mode (step S102).

When the control unit 30 judges that the mode is not the image capturing mode either (No in step S102), the process proceeds to step S112. When the control unit 30 judges that the mode is the image capturing mode (Yes in step S102), the control unit 30 executes the image capturing process and the display control unit 34 displays a live view on the display unit 22 (step S104).

The operation detection unit 36 judges whether or not an instruction to capture an image has been given (step S106). When the control unit 30 judges by means of the operation detection unit 36 that the image capturing instruction has been given (Yes in step S106), the control unit 30 executes image capturing (step S108), and records the image information 24a on the memory 24. When the control unit 30 judges that an instruction to capture an image has not been given (No in step S106), the process proceeds to step S110.

The control unit 30 judges whether or not the mode is the reproduction mode (step S110). When the control unit 30 judges that the mode has been changed from the image capturing mode to the reproduction mode (Yes in step S110), the control unit judges whether or not the standby condition has been satisfied (step S112). When the control unit 30 judges that the standby condition has not been satisfied (No in step S112), the process returns to step S100.

In addition, when the control unit 30 judges that the mode is not the reproduction mode (No in step S110), the process returns to step S106. When the control unit 30 judges that the standby condition has been satisfied (Yes in step S112), the control unit 30 executes the power-saving mode (step S114).

Returning to step S100, when the control unit 30 judges that the mode is the reproduction mode (Yes in step S100), the control unit 30 decides whether or not to display the band-like image (step S120). When the control unit 30 judges that there are no instructions to display the band-like image (No in step S120), the control unit 30 performs normal display (step S122), and the process proceeds to the aforementioned step S112.

When the control unit 30 judges that an instruction to display the band-like image has been given (Yes in step S120), the control unit 30 selects a display image group to be displayed as the band-like image (step S124). An operator may specify the range of the display image group on the screen. The maximum number of band-like images that constitute the display image group is 100, for example. When the operator does not specify the range, the specified number (for example, 100) of captured images are selected in order of image capturing date and time from the oldest from among the image information 24a that is recorded in the memory 24.

The control unit 30 executes the band-like image information creation process (step S126). For example, the control unit 30 executes the band-like image information creation process on captured images in order of captured date and time from the oldest. The band-like image information creation process is executed according to the captured image information 24a that has been read from the memory 24. Since the specific process procedures are the same as those in the aforementioned subroutine in FIG. 7, the description thereof will be omitted.

The memory control unit 32 records the created band-like image information 24b and the band relating information 24c on the memory 24 (step S128). The control unit 30 judges whether or not the band-like image information creation process has been terminated on all the images in the selected display image group (step S130). When the control unit 30 judges that the band-like image information creation process has not been terminated on all the images in the selected display image group (No in step S130), the control unit 30 selects another image (step S132), and the process returns to step S126.

When the control unit 30 judges that the band-like image information creation process has been terminated on all the images (Yes in step S130), the display control unit 34 creates the band-like image sequence that is obtained by horizontally arranging the band-like images in one line by using the band-like image information 24b, and displays the band-like image sequence (step S134), which is the example displayed on the screen 110 in FIG. 4. Hereinafter, since steps S146-S158 are a process for displaying a thumbnail image or an enlarged image on the displayed band-like image sequence and are the same process as that in steps S46-S58, the description thereof will be omitted.

According to the above-described first embodiment, since a search image is made to be a one-dimensional (linear or band-like) image with only color information, more search images may be displayed even on a small display unit in comparison with thumbnail images.

In addition, since a characteristic color that is extracted for each block is used as the characteristic color of an image, characteristics of the image become more distinct in comparison with the case of using the color at the center of the captured image or the average color of the entirety of the captured image. For example, when the colors on the entirety of the captured image are averaged, the color often becomes close to gray, the characteristics of the image disappear, and there is no difference between the image and another image.

In addition, since the characteristic colors are classified into color groups, the color groups are arranged so as to obtain the one-dimensional band-like image, and the band-like images are displayed as the band-like image sequence instead of displaying the blocks two-dimensionally as they are, color balance differences between captured images become distinct. In addition, by displaying the band-like image sequence, a color balance and changes in color balance are clearly expressed, and an image may be searched for by using them. This is because the color balance of an image is greatly affected by when and where the image is captured. In addition, by displaying the image by converting the characteristic color of each block into a color obtained by increasing the chroma thereof or converting the characteristic color into the pure color, identifiability may be further improved.

In addition, since a thumbnail image is displayed so as to be superimposed on the band-like image sequence by means of a slide operation on the band-like image sequence and furthermore an enlarged image is displayed by means of a single touch operation, display is smoothly transferred from the band-like image to the thumbnail image or the enlarged image and image searching will be easier.

Second Embodiment

A second embodiment describes an example for creating a band-like image by including characteristics of the captured image other than color in addition to the characteristic colors of the blocks. In this example, image search performance is enhanced by embedding a code in a specified position of the band-like image according to the characteristics of the image or changing the order of color groups according to the characteristics of the image.

Figure 9:
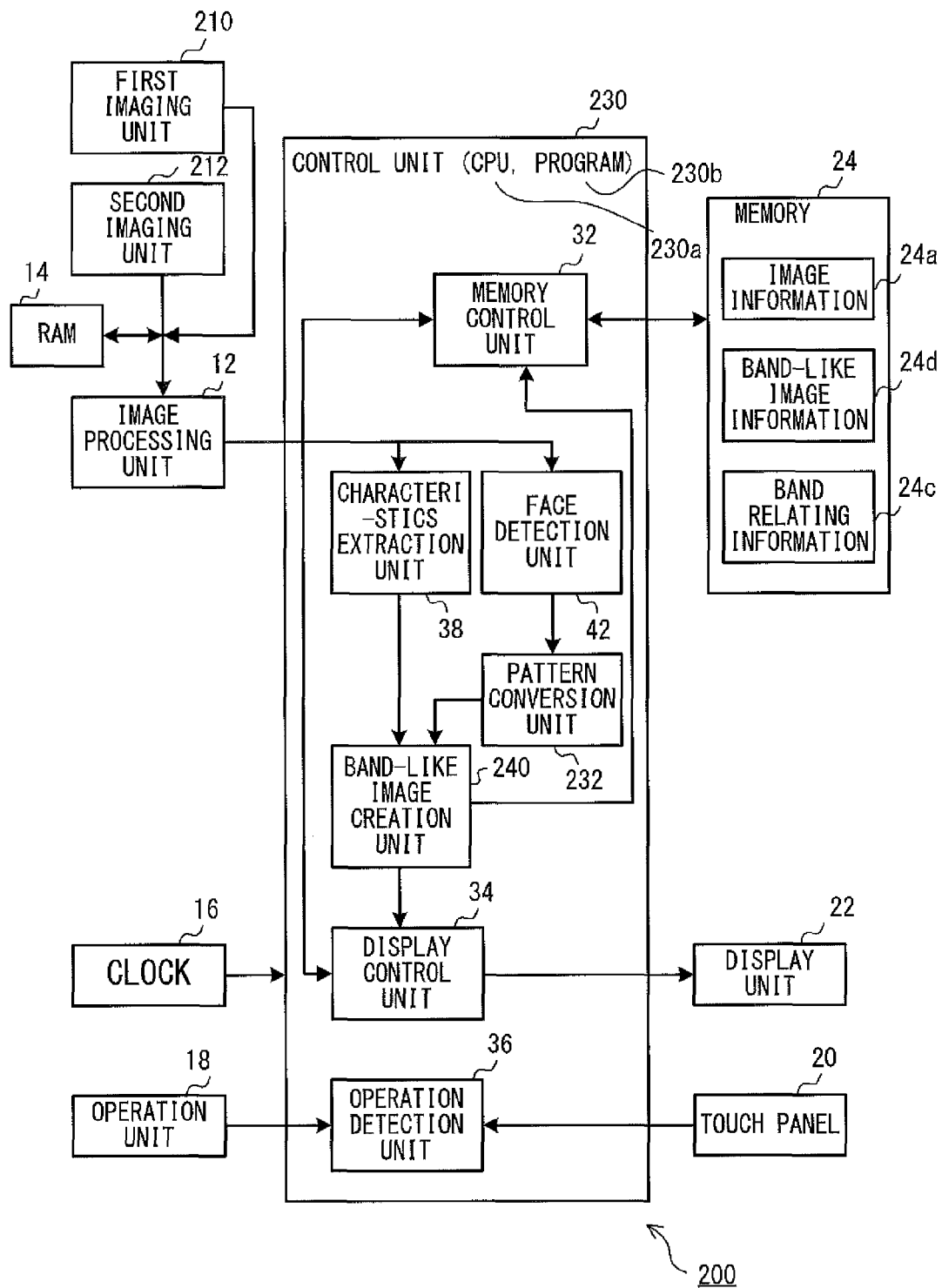
FIG. 9 is a block diagram of a digital camera according to a second embodiment.

FIG. 9 is a block diagram of a digital camera 200 mounted with the characteristic image display apparatus in the second embodiment. The portion that is common to that in the block diagram in the first embodiment in FIG. 1 is denoted by the same reference numeral. Hereinafter, a description will be made focusing on points of difference between this block diagram and the block diagram in FIG. 1.

The digital camera 200 includes two imaging units, that is, a first imaging unit 210 and a second imaging unit 212. The first imaging unit 210 is an imaging unit that is equivalent to the imaging unit 10 and is configured to capture an image of an object. The second imaging unit 212 is an imaging unit whose camera unit is provided on the back of the digital camera 200 and which is configured to capture an image of a photographer. The captured image that is captured by means of the second imaging unit 212 is recorded on the memory 24 in association with the captured image that is captured by means of the first imaging unit 210. Since the face of a photographer is recorded at the same time in such a camera, it is quickly found out who the photographer is, and a problem may be solved wherein images of a person who dedicates himself to capturing images are not taken during a family trip, etc.

The first imaging unit 210 and the second imaging unit 212 output image data of an object image and a photographer image, respectively. The image processing unit 12 correspondingly outputs image data of the object image and the photographer image. The characteristics extraction unit 38 decides the characteristic color of each block for image data of the object image in the same manner as in the first embodiment. The face detection unit 42 detects a face image according to the image data of the object image and the photographer image, collates the face image with registered face images, and specifies the person's name in the object image and the photographer image.

The control unit 230 is a control unit configured to generally control the entirely of the digital camera 200. The control unit 230 includes a CPU 230a and a control program 230b. The CPU 230a loads the control program 230b and executes a control process. The control unit 230 includes as a function unit related to a display control process that is executed by the CPU 230a the memory control unit 32, the display control unit 34, the operation detection unit 36, the characteristics extraction unit 38, the face detection unit 42, a pattern conversion unit 232, and a band-like image creation unit 240.

The pattern conversion unit 232 is configured to code part of a band-like image or to change the order of color groups according to detected characteristics (a pattern) of an image. For example, the pattern conversion unit 232 codes the name of a person detected by the face detection unit 42 and outputs code information to the band-like image creation unit 240.

The band-like image creation unit 240 creates a band-like image by embedding a code in a specified position of the band-like image that is obtained by arranging in a line small images (cell images) based on the characteristic colors of blocks of the captured image or changing the order of color groups according to the pattern that has been converted by the pattern conversion unit 232.

First, an example of creating a coded band-like image by using a pattern will be described. When code information is output from the pattern conversion unit 232, the band-like image creation unit 240 creates a coded band-like image in which a code is embedded.

An example of coding an object person or a photographer and embedding the coded object person or the photographer in a band-like image will be described. Note that a target to be coded is not limited to an object person. For example, specific targets (for example, a mountain, the sea, a skyscraper, etc.) may be detected and coded. In addition, an image capturing date and time (for example, Sunday, or the season), an image capturing place, and an image capturing condition of a camera (for example, a night view mode) may be coded. Furthermore, voice data that is detected by means of a microphone (not shown) may be coded.

Figure 10:
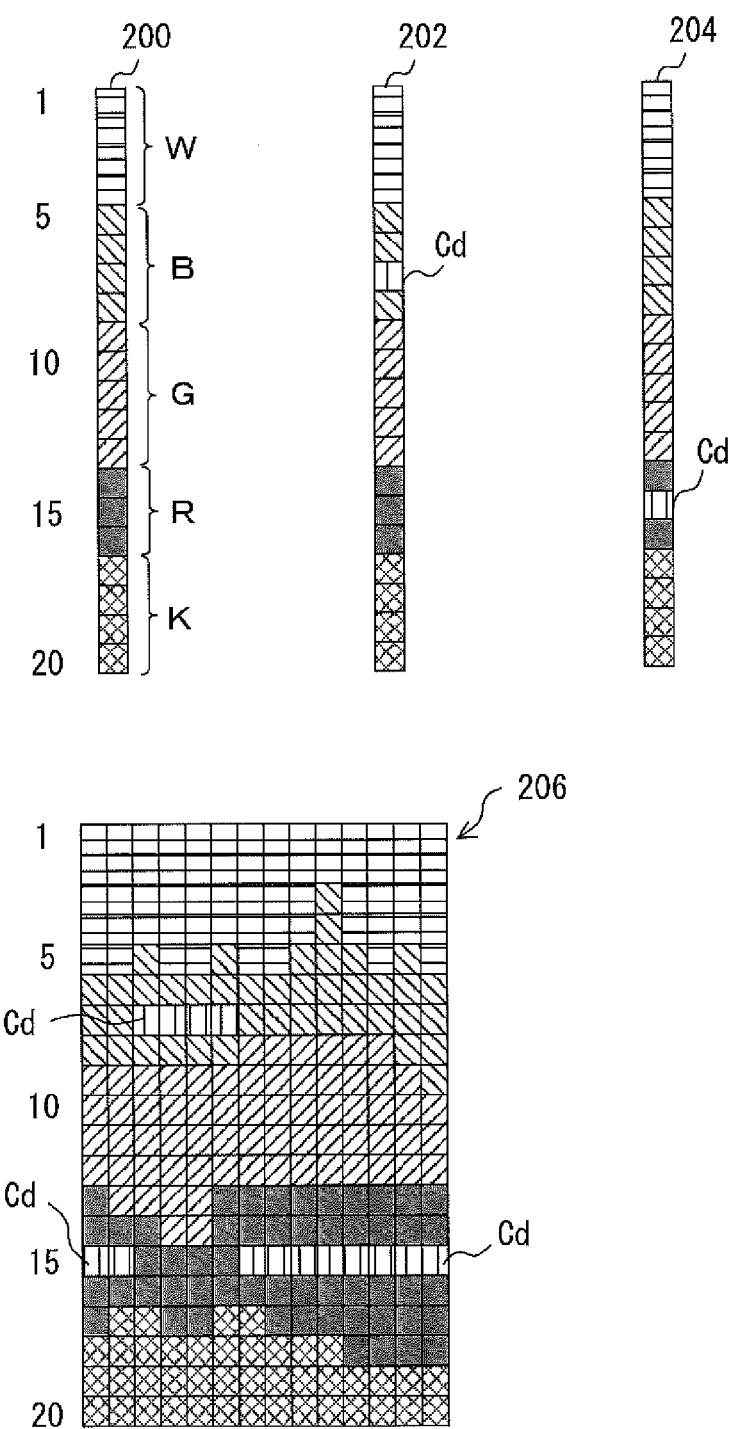
FIG. 10 illustrates examples of a band-like image with a code.

FIG. 10 illustrates examples of coded band-like images. A band-like image 200 illustrates a state with no codes. Color groups are arranged in the order of "white (W), blue (B), green (G), red (R), and black (K)" from the top in the same manner as in FIG. 5. In this example, it is assumed that there are 20 cell images in total. Band-like images 202 and 204 are coded band-like images.

The band-like image 202 is a band-like image in which a code image Cd is attached at approximately one third a distance from the top. For example, when person A who has been registered in advance is detected as a photographer, the band-like image 202 is displayed. When person A is detected in a captured image of the second imaging unit by the face detection unit 42, the pattern conversion unit 232 outputs to the band-like image creation unit 240 information for attaching the code image Cd to the band-like image at approximately one third the distance from the top. Correspondingly, the band-like image creation unit 240 creates the band-like image 202. The positional relationship between the photographer and the code image Cd is set in advance. For example, the code image Cd is a yellow single-color image.

The band-like image 204 is a band-like image to which the code image Cd is attached at approximately one third the distance from the bottom. For example, the band-like image 204 illustrates a case in which person B is detected as a photographer by the face detection unit 42. When person B is detected, the pattern conversion unit 232 outputs to the band-like image creation unit 240 information for attaching the code image Cd to the band-like image at approximately one third the distance from the bottom. Correspondingly, the band-like image creation unit 240 creates the band-like image 204. The color of the code image Cd may be yellow or a color that stands out against the original color of the cell image in which the code image is embedded may be selected. Alternatively, the pattern conversion unit 232 may change the color of the code image Cd instead of the embedded position of the code image Cd according to a photographer.

A screen 206 is part of the band-like image sequence that is composed of coded band-like images. Since the photographer of an image may be identified by the position of the code image Cd, an operator may easily search for an image by using as a key the photographer as well as a color of a captured image in band-like image searching.

Figure 11:
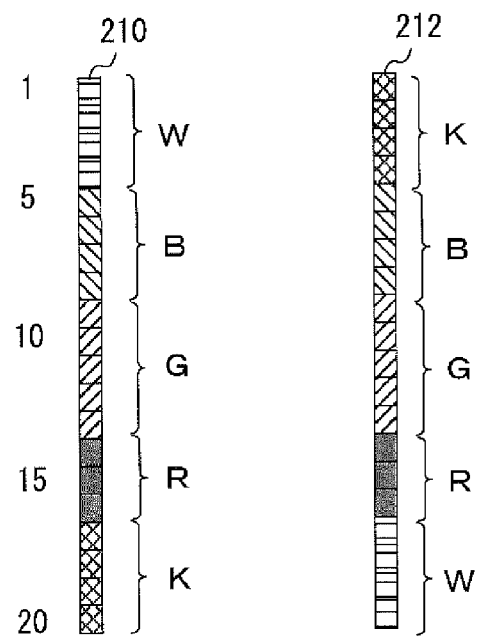
FIG. 11 is a diagram explaining an example in which the order of color groups of a band-like image is changed according to a pattern.
Figure 11:
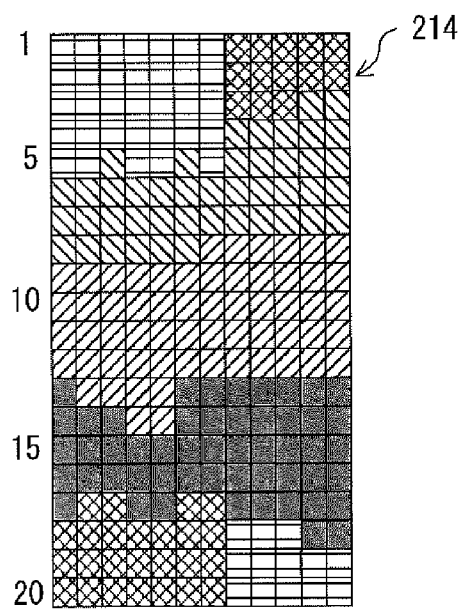

FIG. 11 is a diagram explaining an example in which the order of color groups of a band-like image is changed according to a pattern. A band-like image 210 illustrates a case in which the order of color groups is normal. The order is "white (W), blue (B), green (G), red (R), and black (K)" from the top. A band-like image 212 illustrates an example in which the order of color groups is changed according to a pattern and the order of "white (W) and black (K)" is swapped.

For example, when a "child" is detected as an object, the pattern conversion unit 232 outputs to the band-like image creation unit 240 information for setting black (K) at the top. A screen 214 is part of an image sequence that is composed of band-like images. In the first to seventh band-like images from the left, black (K) is located at the lowermost part, and in the eighth and the following band-like images from the left, black (K) is located at the uppermost part. From this, it is obvious at a glance that an image of a child is captured in the eighth and the following images from the left.

In addition, as an another example, the pattern conversion unit 232 may output to the band-like image creation unit 240 information for setting black (K) at the top when the image capturing condition of a camera is the night view mode or the image captured time is nighttime. In the case of the screen 214, it can be easily found that the eighth and the following images from the left were captured at nighttime.

Returning to FIG. 9, the display control unit 34 displays the band-like image sequence on the display unit 22. The memory control unit 32 records on the memory 24 band-like image information 24d, which is a coded band-like image, image information 24a, and band relating information 24c.

Figure 12B:
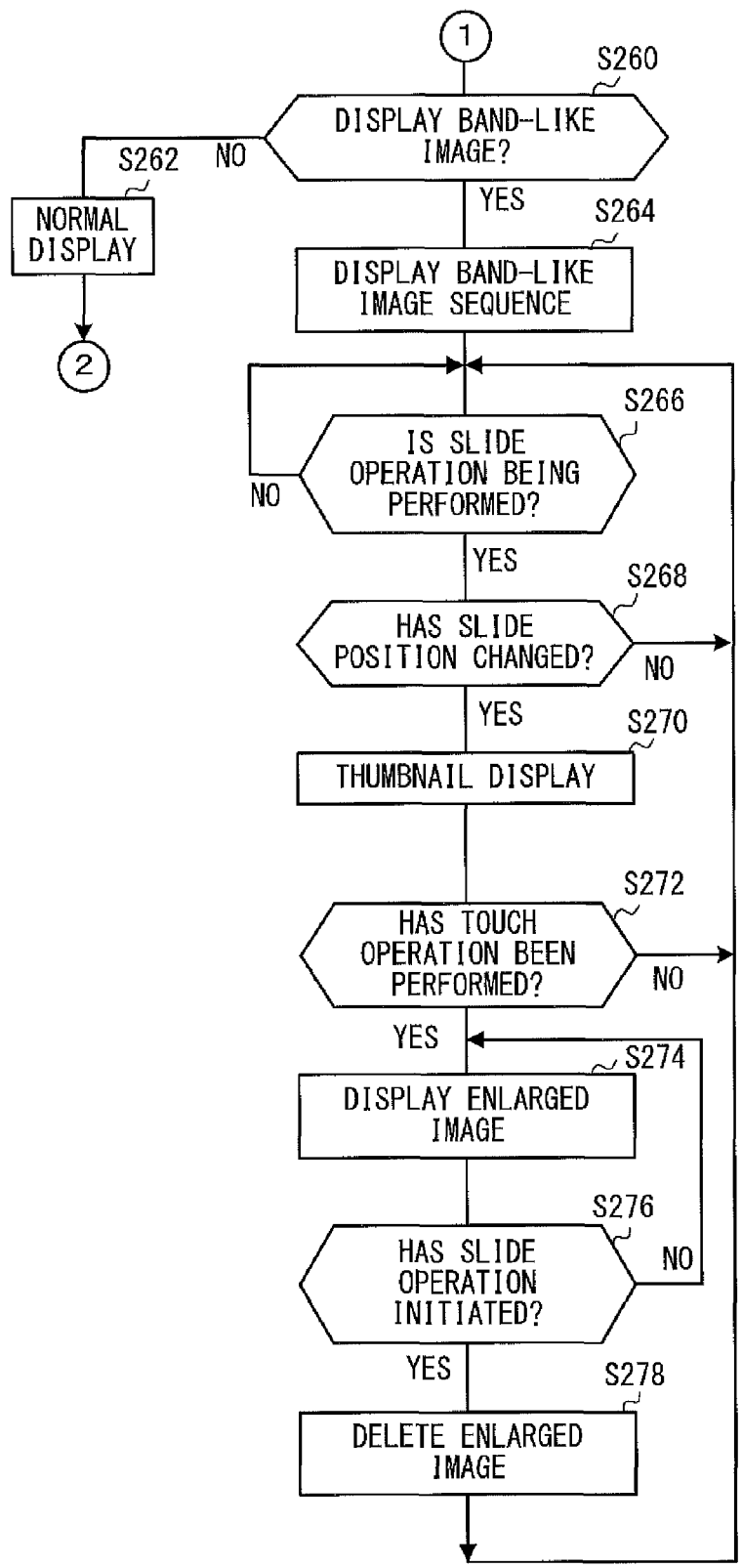
FIG. 12B illustrates main flowchart 2 explaining procedures for the process for creating a band-like image.

FIGS. 12A and 12B are main flowcharts explaining procedures for creating and processing a band-like image. FIG. 12A is main flowchart 1 and FIG. 12B is main flowchart 2. The flowcharts in FIGS. 12A and 12B are different from the flowchart in FIG. 6 in that they include information obtained via pattern conversion; however, the other processes are common in the flowcharts, and therefore the common processes will be described briefly.

The process for creating and displaying a band-like image is executed by the control unit 230 (including the memory control unit 32, the display control unit 34, the operation detection unit 36, the characteristics extraction unit 38, the face detection unit 42, the pattern conversion unit 232, and the band-like image creation unit 240).

The control unit 230 judges whether or not the mode is the reproduction mode (step S200). When the control unit 230 judges that the mode is not the reproduction mode (No in step S200), the control unit 230 judges whether or not the mode is a multi-lens image capturing mode (step S202). The multi-lens image capturing mode is an image capturing mode for using both the first imaging unit 210 and the second imaging unit 212.

When the control unit 230 judges that the mode is the multi-lens image capturing mode (Yes in step S202), the control unit 230 displays a multi-lens image synthesized live view (step S204). The multi-lens image synthesized live view is a live view obtained by synthesizing part of the (object) image taken by the first imaging unit 210 with another vision (photographer) image taken by the second imaging unit 212.

Figure 13:
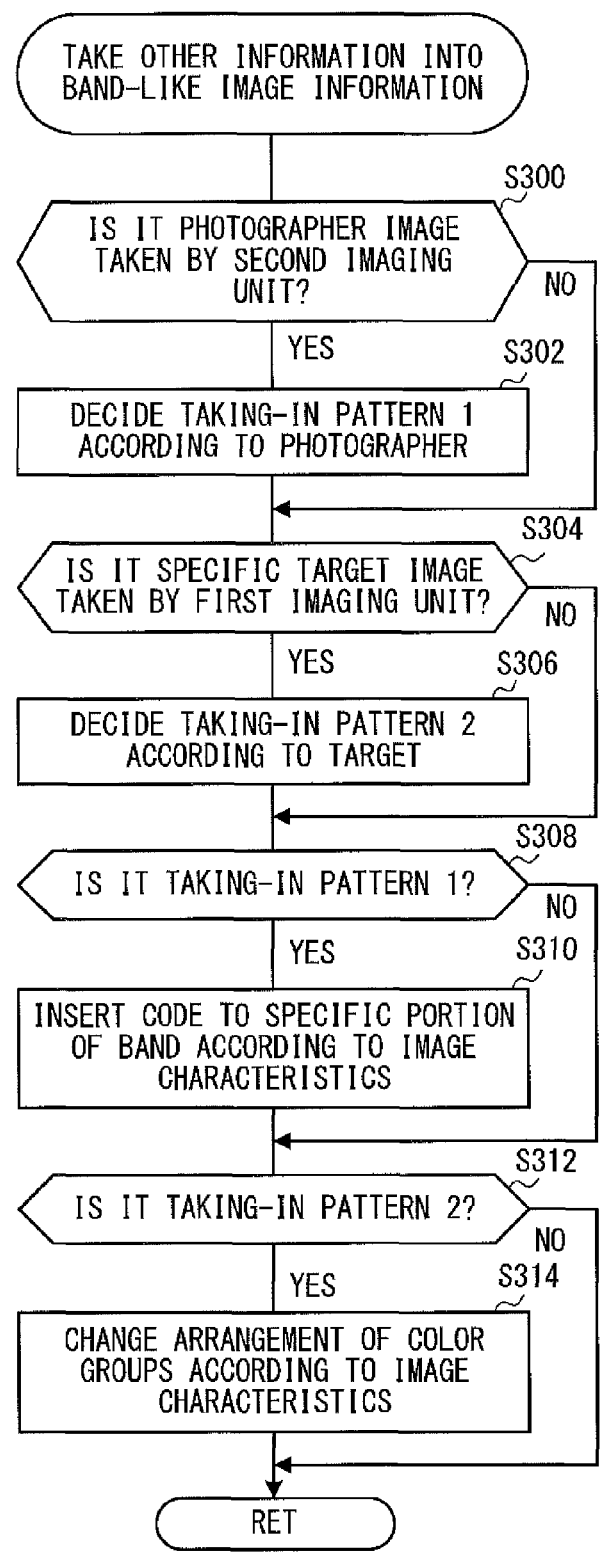
FIG. 13 illustrates a subroutine explaining taking-in of other information into band-like image information.

The control unit 230 judges by means of the operation detection unit 36 whether or not an instruction to capture an image has been given (step S206). When the control unit 230 judges that an instruction to capture an image has been given (Yes in step S206), the control unit 230 executes image capturing (step S208), and records the image information 24a on the memory 24. After capturing the image, the control unit 230 executes the band-like image information creating process (step S210). Since the band-like image information creating process is the same as the aforementioned subroutine in FIG. 7, the description thereof will be omitted. Next, other information is taken into the created band-like image information (step S212). FIG. 13 illustrates a subroutine explaining taking-in of other information to the band-like image information.

The pattern conversion unit 232 judges whether or not a photographer image has been detected by the face detection unit 42 in the image captured by means of the second imaging unit 212 (step S300). When the pattern conversion unit 232 judges that the photographer image has been detected (Yes in step S300), the pattern conversion unit 232 decides taking-in pattern 1 according to a photographer (step S302). Taking-in pattern 1 is a pattern for embedding a code in a specific portion of a band-like image as described in FIG. 10.

When the pattern conversion unit 232 judges that a photographer image has not been detected (No in step S300), the pattern conversion unit 232 judges whether or not a specific target image has been captured by means of the first imaging unit 210 (step S304). When the pattern conversion unit 232 judges that the specified target image has been captured (Yes in step S304), the pattern conversion unit 232 decides taking-in pattern 2 according to a specified target (step S306). Taking-in pattern 2 is a pattern obtained by changing the order of color groups of a band-like image as described in FIG. 11. Examples of the specific object include a "child" and a "pet". When the pattern conversion unit 232 judges that the specific target image has not been captured (No in step S304), the process proceeds to step S308.

The pattern conversion unit 232 judges whether or not taking-in pattern 1 has been decided (step S308). When the pattern conversion unit 232 judges that taking-in pattern 1 has been decided (Yes in step S308), a code is inserted in a specified part of a band according to image characteristics (a photographer) (step S310). As described in FIG. 10, a code is inserted in different positions according to detected persons as described in FIG. 10. When the pattern conversion unit 232 judges that taking-in pattern 1 has not been decided (No in step S308), the process proceeds to step S312. In addition, a pattern different in color or size may be taken into the same position according to a person.

The pattern conversion unit 232 judges whether or not taking-in pattern 2 has been decided (step S312). When the pattern conversion unit 232 judges that taking-in pattern 2 has been decided (Yes in step S312), the pattern conversion unit 232 changes the arrangement order of the color groups according to image characteristics (a specified target) (step S314). For example, when it is assumed that an image of a "child" is captured as a specified target, black (K) is set to the top of the band-like image, and when it is assumed that an image of a "pet" is captured as a specified target, red (R) is set to the top of the band-like image.

Next, the process proceeds to step S214 in FIG. 12A. In addition, when the pattern conversion unit 232 judges that taking-in image 2 has not been decided (No in step S312), the process proceeds to step S214 in FIG. 12A.

The control unit 230 records the captured image and the band-like image (step S214). In addition, when the control unit 230 judges that an instruction to capture an image has not been given (No in step S206), the process proceeds to step S216.

The control unit 230 judges whether or not the mode is the reproduction mode (step S216), and when the control unit 230 judges that the mode is not the reproduction mode (No in step S216), the process returns to step S206. When the control unit 230 judges that the mode has been changed from the image capturing mode to the reproduction mode (Yes in step S216), the control unit 230 judges that the standby condition is satisfied (step S246). When the control unit 230 judges that the standby condition is not satisfied (No in step S246), the process returns to step S200. When the control unit 230 judges that the standby condition is satisfied (Yes in step S246), the control unit 230 executes the power-saving mode (step S248).

Returning to step S202, when the control unit 230 judges that the mode is not the multi-lens image capturing mode (No in step S202), the control unit 230 judges whether or not the mode is a single-lens image capturing mode (step S230). The single-lens image capturing mode is a normal image capturing that uses only the first imaging unit 210. When the control unit 230 judges that the mode is the single-lens image capturing mode (Yes in step S230), the image capturing process is executed, and the display control unit 34 displays a live view on the display unit 22 (step S232).

The control unit 230 judges whether or not an instruction to capture an image has been given (step S234). When the control unit 230 judges that an instruction to capture an image has been given (Yes in step S234), the control unit 230 executes image capturing (step S236), and records the image information 24a on the memory 24.

After capturing the image, the control unit 230 executes the band-like image information creation process (step S238). Since the band-like image creation process is the same as the aforementioned subroutine in FIG. 7, the description thereof will be omitted. Next, other information is taken into band-like image information (step S240). The process for taking other information into the band-like image information is the subroutine that has been described in FIG. 13. Note that since the mode is the single-lens image capturing mode, a photographer image is not captured by means of the second imaging unit (No in step S300) and taking-in pattern 1 is not decided (No in step S308).

The control unit 230 records the captured image and the band-like image (step S242). In addition, when the control unit 230 judges that an instruction to capture an image has not been given (No in step S234), the process proceeds to step S244. Since the processes in step S244 and subsequent steps are the same as described above, the description thereof will be omitted. In addition, when the control unit 230 judges that the mode is not the single-lens image capturing mode (No in step S230), the process proceeds to step S246. Since step S246 and subsequent steps have already been described, the description thereof will be omitted.

Returning to step S200, when the control unit 230 judges that the mode is the reproduction mode (Yes in S200), the process proceeds to FIG. 12B. The process in steps S260-S278 is a process for displaying a thumbnail image or an enlarged image on a displayed band-like image sequence, and the description thereof will be omitted because the process is the same as that in steps S40-58.

According to the above described band-like image of the second embodiment, in addition to the first embodiment, the band-like image is displayed in which not only the characteristics of colors but also characteristics of the object and the photographer, or the image capturing position, date and time, condition, etc. are included, and therefore convenience of searching is further improved.

Note that the second imaging unit 212 is not essential for the digital camera 200 of the second embodiment. Even though the first imaging unit 210 is the only imaging unit, the second embodiment is applicable except the photographer identifying process.

Next, as an extended form of the first embodiment, a method will be described for creating one piece of band-like image information from a plurality of relevant images. In the first embodiment, the process for creating one piece of band-like image information from one image has been described. However, a single image is not always captured, and group images such as continuously shot images and panoramic images, which are captured in association with one another, are often captured. The image taken by means of the second imaging unit of the camera of the above-mentioned second embodiment is an example of the group images. In regard to such group images, it is often more appropriate to create one band-like image collectively from the plurality of group images and to display the band-like image rather than to create band-like images individually and to display the band-like images.

Figure 14:
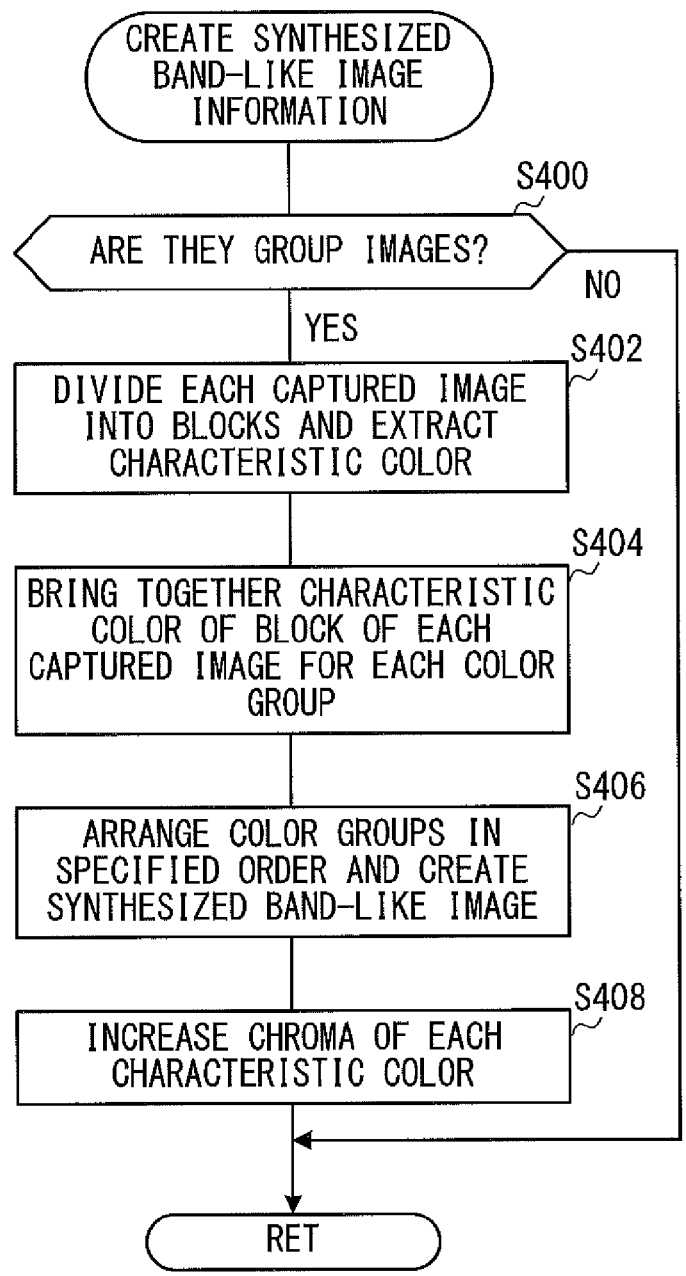
FIG. 14 illustrates a subroutine explaining a process for creating synthesized band-like image information.

Hereinafter, a synthesized band-like image information creating process will be described for creating one piece of band-like image information from group images. If roughly described, this process is different from that in the first embodiment only with respect to the subroutine in FIG. 7. FIG. 14 illustrates a subroutine of the synthesized band-like image information creating process in place of the process in FIG. 7. The synthesized band-like image information creating process will be described in accordance with FIG. 14 by omitting the content that is common to that in the first embodiment in FIG. 6 etc.

A control unit 30 judges whether or not captured images are group images (step S400). For example, captured images are judged to be group images when image capturing in step S18 is continuous shots or panorama image capturing. When the control unit 30 judges that the captured images are not group images (No in step S400), the subroutine in FIG. 14 is terminated. When the control unit 30 judges that the captured images are group images (Yes in step S400), the control unit 30 divides each captured image into blocks and extracts characteristic colors (step S402) when group image capturing is terminated. In detail, this process corresponds to that in steps S70-74 in FIG. 7.

The control unit 30 brings together characteristic colors that have been extracted from the blocks of each captured image for each color group (step S404). The same characteristic color in different captured images is brought together in a common color group. The control unit 30 arranges the color groups in a specified order and creates a synthesized band-like image (step S406). The arrangement order of the color groups is the same as described insteps S78-S80. The control unit 30 creates synthesized band-like image information composed of cell images that are arranged so that the same characteristic color of different captured images is brought together for each color group.

Here, the control unit 30 may set the total number of blocks to the total number of cell images; however, since a band-like image becomes too long when there are many group images, the control unit 30 may thin out blocks. That is, also in the case of group images, blocks are arbitrarily thinned out to create a band-like image, so that the length of the synthesized band-like image is equal to the length of the band-like image of a single captured image. Furthermore, the control unit 30 increases the chroma of each characteristic color as necessary (step S408).

Note that when the band-like image is a synthesized band-like image, thumbnail images of a plurality of corresponding images are displayed as thumbnail images that are displayed due to a slide operation in the reproduction mode.

Figure 15:
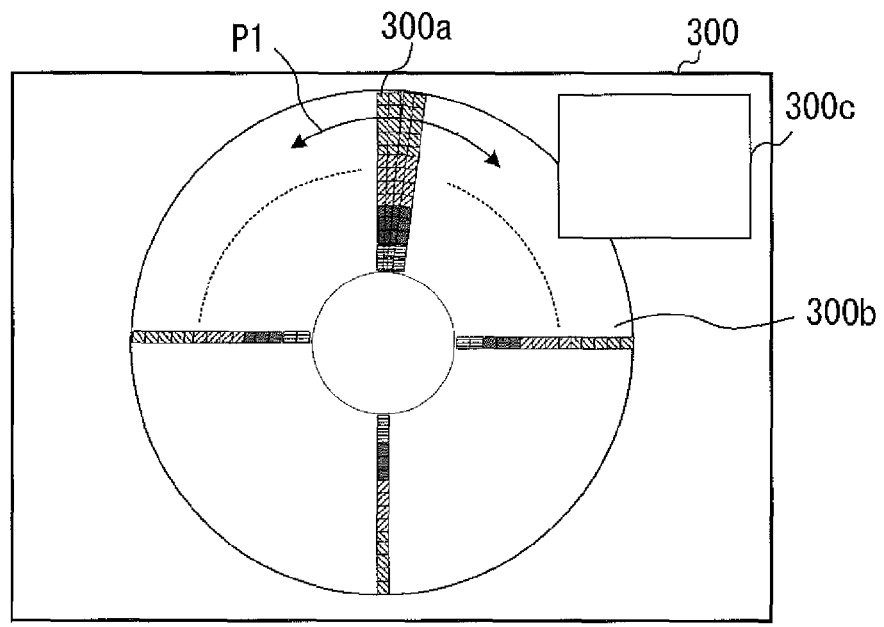
FIG. 15 is a diagram illustrating other display examples of band-like images.
Figure 15:
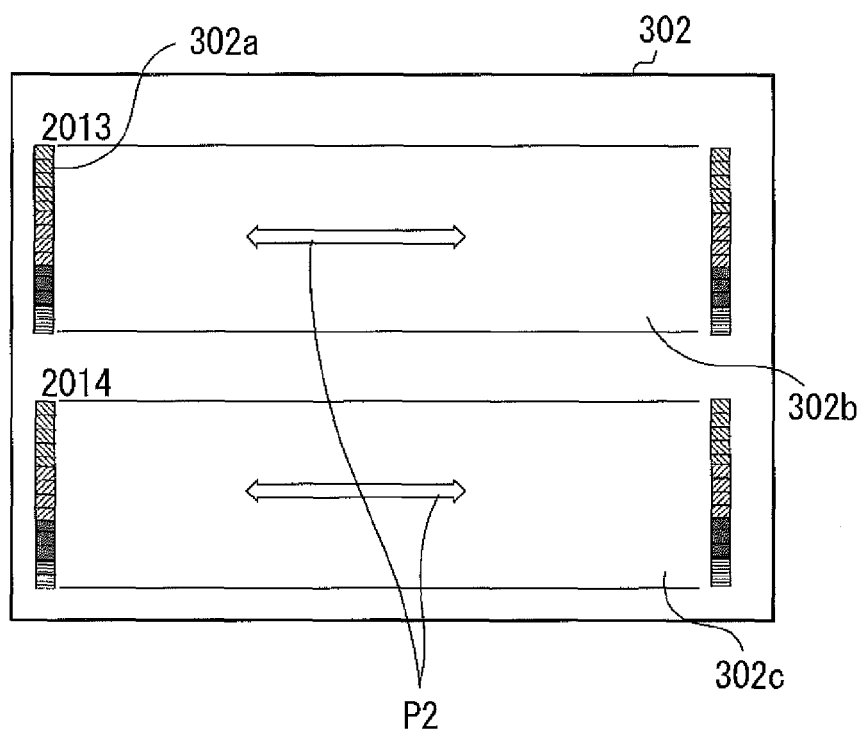

FIG. 15 is a diagram illustrating other display examples of band-like images. A screen 300 is an example of arraying band-like images 300a on a circumference and displaying the band-like images as a ring-shaped band-like image sequence 300b. The thumbnail image 300c of the band-like image 300a that is located at a finger position is switched over when an operator performs a rotating operation in the arrow P1 direction on the touch panel 20. Note that as illustrated in this example, band-like images may be arranged either vertically or horizontally, and a band-like image sequence is not always arranged in the horizontal direction.

A screen 302 is an example for displaying band-like image sequences in multiple stages. On the upper stage of the screen 302, band-like images 302a of the images that were captured in 2013 are displayed as a band-like image sequence 302b. On the lower stage of the screen 302, band-like images 302a of the images that were captured in 2014 are displayed as a band-like image sequence 302c. The thumbnail image (not shown) is switched over when an operator performs a slide operation in the arrow P2 direction on the touch panel 20.

Note that a band-like image may be any elongated image that has a visible width, and the shape thereof is not limited to the linear shape that has been illustrated so far and may be a curved or arc shape.

In the above first and second embodiments, an example of mounting the characteristic image display apparatus on a digital camera has been described; however, the embodiments are not limited to a digital camera and are applicable to another imaging device or a reproduction-dedicated image device. In addition, although it has been described that the control unit 30 (230) is realized via the software process that is executed by the CPU that loads the control program, part or the entirety of the control unit 30 (230) may be composed of hardware.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATION OF LETTERS OF NUMERALS 1, 200 Digital camera
10 Imaging unit
12 Image processing unit
14 RAM
16 Clock
18 Operation unit
20 Touch panel
22 Display unit
24 Memory
24a Image information
24b Band sequence information
24c Band relating information
30, 230 Control unit
32 Memory control unit
34 Display control unit
36 Operation detection unit
38 Characteristics extraction unit
40, 240 Band-like image creation unit
42 Face detection unit
210 First imaging unit
212 Second imaging unit
232 Pattern conversion unit

What is claimed is:

1. A characteristic image display apparatus comprising a control unit including a central processing unit and a control program, the control program comprising:
   a characteristics extraction unit configured to divide a captured image into a plurality of blocks and extract a characteristic color from each block;
   a band-like image creation unit configured to create a band-like image by classifying characteristic colors that are extracted in the blocks into specified color groups and connecting small single-color images in a line according to a set order of the color groups; and
   a display control unit configured to display a band-like image sequence that is obtained by arranging the plurality of created band-like images.

2. The characteristic image display apparatus according to claim 1, wherein the band-like image creation unit
   determines a number of blocks in the characteristic color that belongs to each color group as an order of each color group, and
   sets the order of color groups in order of a number of blocks in each characteristic color that belongs to each color group.

3. The characteristic image display apparatus according to claim 1,
   wherein the band-like image creation unit arranges in a line small single-color images that are obtained from each captured image with respect to a plurality of captured images, and creates one synthesized band-like image.

4. The characteristic image display apparatus according to claim 1,
   wherein the band-like image creation unit sets a predetermined color order as an order of the color groups.

5. The characteristic image display apparatus according to claim 1,
   wherein the band-like image creation unit includes at least three colors, red, green, and blue as the color groups.

6. The characteristic image display apparatus according to claim 1,
   wherein the band-like image creation unit uses a color that is obtained by increasing a chroma of each characteristic color as a color of the small single-color image.

7. The characteristic image display apparatus according to claim 1,
   wherein the band-like image creation unit makes characteristic colors in the color group a same color as a color of the small single-color image.

8. The characteristic image display apparatus according to claim 1,
   wherein the display control unit arranges the band-like images in order of image capturing date and time of original captured images, and displays the arranged band-like images as a band-like image sequence.

9. The characteristic image display apparatus according to claim 1, wherein the control program further comprises:
   a pattern conversion unit configured to convert image capturing information of a captured image into a specified pattern,
   wherein the band-like image creation unit incorporates a code image that corresponds to the converted pattern into part of a small single-color image that constitutes the band-like image.

10. The characteristic image display apparatus according to claim 9, wherein
    the pattern conversion unit converts an object person that has been detected from a captured image into the pattern as the image capturing information, and
    the band-like image creation unit changes an incorporating position of the code image in the band-like image according to the object person.

11. A characteristic image display method comprising:
    dividing a captured image into a plurality of blocks and extracting a characteristic color from each block;
    creating a band-like image by classifying characteristic colors that are extracted in the blocks into specified color groups and connecting small single-color images in a line according to a set order of the color groups; and
    display a band-like image sequence that is obtained by arranging the plurality of created band-like images.

12. A computer-readable non-transitory storage medium having stored therein a program for causing a computer to execute a process, the process comprising:
    dividing a captured image into a plurality of blocks and extracting a characteristic color from each block;
    creating a band-like image by classifying characteristic colors that are extracted in the blocks into specified color groups and connecting small single-color images in a line according to a set order of the color groups; and
    displaying a band-like image sequence that is obtained by arranging the plurality of created band-like images.

* * * * *